May 23, 1972     R. C. JOHNSON     3,664,716

DRAWER SUSPENSION

Filed Dec. 22, 1970

INVENTOR
RONALD C. JOHNSON

BY *Emory L. Groff*

ATTORNEY

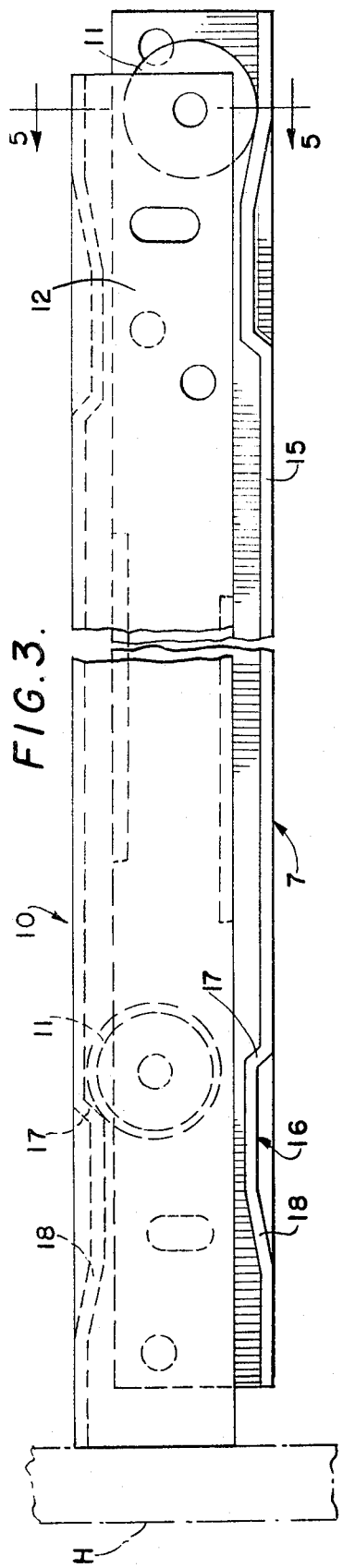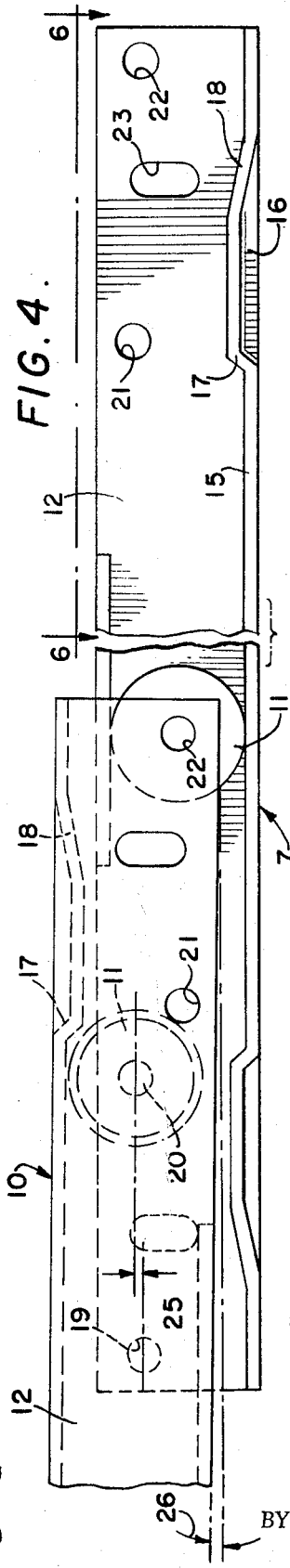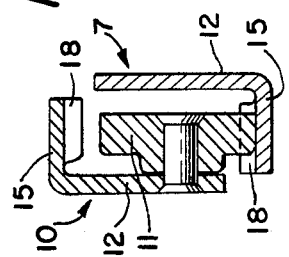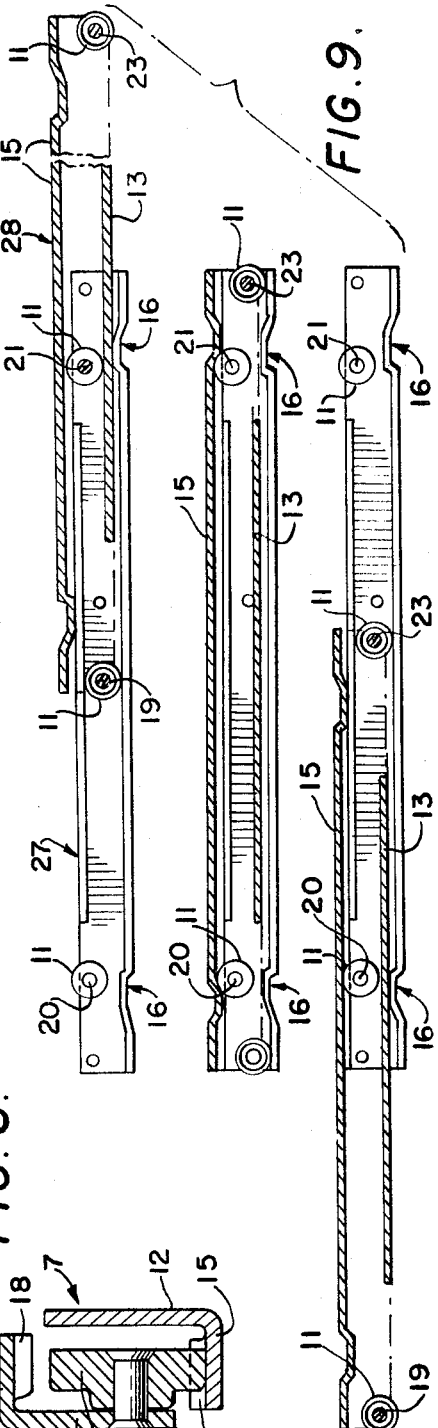

United States Patent Office 3,664,716
Patented May 23, 1972

3,664,716
DRAWER SUSPENSION
Ronald C. Johnson, Rochester, Minn., assignor to The General Fireproofing Company, Youngstown, Ohio
Filed Dec. 22, 1970, Ser. No. 100,658
Int. Cl. F16c 21/00
U.S. Cl. 308—3.8
9 Claims

ABSTRACT OF THE DISCLOSURE

A suspension assembly for an extensible support device includes pairs of cooperating channel elements which are of identical construction. Each channel element is symmetrical about a vertical centerline and includes alternate mounting means adjacent both ends for the selective attachment of an anti-friction supporting element. In use, pairs of these channels are mounted in inverted relationships with a supporting element attached to each channel at opposed ends thereof.

---

This invention relates generally to office furniture construction and more particularly to a suspension or glide assembly for movably-mounted extensible elements such as storage containers, drawers, shelves, writing tablets, machine tables, etc., of the type adapted to be alternately moved to and from a use and non-use position within an enclosure.

Many types of suspension systems are known for attaching such elements within cabinets or cases to permit relative rectilinear movement of the element to and from its housing. The suspension apparatus of the present invention will be described and illustrated as applied to a file drawer and its related cabinet with the understanding that the basic concept will be applicable when practiced with other devices as above mentioned.

In many prior instances, an expensive complicated construction is provided to adequately support the weight of a drawer and to regulate the exact movement thereof. One of the features of the present invention resides in the provision of an economical and extremely easily fabricated suspension system encompassing several advantages over many of the presently known arrangements. Principally, the instant construction comprises a single form of a channel member which is constructed in a specific manner to permit its use as both the drawer and case channels for both sides of the drawer and case. The advantage of such an arrangement will be readily apparent since it is only necessary in this instance to produce a single structural element which is readily manipulated during the assembly of the suspension system to serve as the channel elements for both sides of both the drawer and cabinet. The referenced manipulation may be accomplished without the use of any special tools or the employment of skilled labor, and the very simplicity of such construction will be readily appreciated.

As a further feature of the invention, means are included to provide a self-closing of the drawer after it has been moved to a point just short of its fully closed position, thus insuring that all drawers in a multi-drawer cabinet, for example, will at all times remain fully closed with the heads thereof flushly disposed in the front of the cabinet or enclosure. The structure providing this self-closing action also serves as an anti-rebound device to prevent self-reopening of the drawer if it is slammed shut. By the use of the present suspension channels, the very structure which provides the self-closing operation also serves as an out stop for the drawer when it is withdrawn from the cabinet. Additionally, it will be appreciated, following a further consideration of the present structure, that the drawers supported by the instant suspension system may be easily withdrawn or completely disconnected from the case channels, which action may be accomplished without the necessity of any tools or manipulation of any latches or catches as often associated with prior-known suspension systems.

As will be seen hereinafter, the basic channel element of the present invention is readily adaptable to provide a suspension system for both the more common one-way storage arrangement as well as for a two-way or "pass through" arrangement such as disclosed in Pat. No. 2,914,-370 dated Nov. 24, 1959.

Accordingly, one of the primary objects of the present invention is to provide an improved suspension apparatus for supporting an extensible member within an enclosure and comprising a pair of member channel elements cooperable with a pair of adjacent enclosure channel elements and wherein all of the member and enclosure channels are of identical construction.

Another object of the present invention is to provide an improved drawer suspension including a single channel construction adapted to be mounted in various positions to serve as both the drawer and case channel on both sides of the supported drawer.

A further object of the present invention is to provide an improved drawer suspension including drawer and case channels, each of which is provided with a single roller adjacent one end thereof and each of which is adapted to engage a single protrusion located respectively, at one end of the case channel and at the opposite end of the related drawer channel.

Still another object of the present invention is to provide an improved drawer suspension including a plurality of drawer and case channels all of which are of identical construction and which are provided with a plurality of attaching openings adjacent each end thereof to permit the selective positioning of a supporting roller on each channel.

Yet another object of the present invention is to provide an improved drawer suspension including drawer and case channels wherein supporting rollers are attached to each drawer and case channel in such a manner as to compensate for and correct for sagging of the drawer as it is extended outwards from its case or enclosure.

With these and other objects in view which will more readily appear as the nature of the invention is better understood, the invention consists in the novel construction, combination, and arrangement of parts hereinafter more fully described, illustrated, and claimed.

A preferred and practical embodiment of the invention is shown in the accompanying drawings in which:

FIG. 3 is an enlarged partial side elevation and illustrates the position of a related pair of drawer and case channels as they appear when the drawer is fully closed within the case;

FIG. 4 is a side elevation similar to FIG. 3 and illustrates the relationship of a pair of drawer and case channels when the drawer is in its fully extended position;

FIG. 5 is a transverse sectional view along the line 5—5 of FIG. 3;

FIG. 9 is a side elevation of three pairs of channel elements as mounted to provide a suspension for a two-way or "pass through" installation.

Similar reference characters designate corresponding parts throughout the several figures of the drawings.

Figure 1:
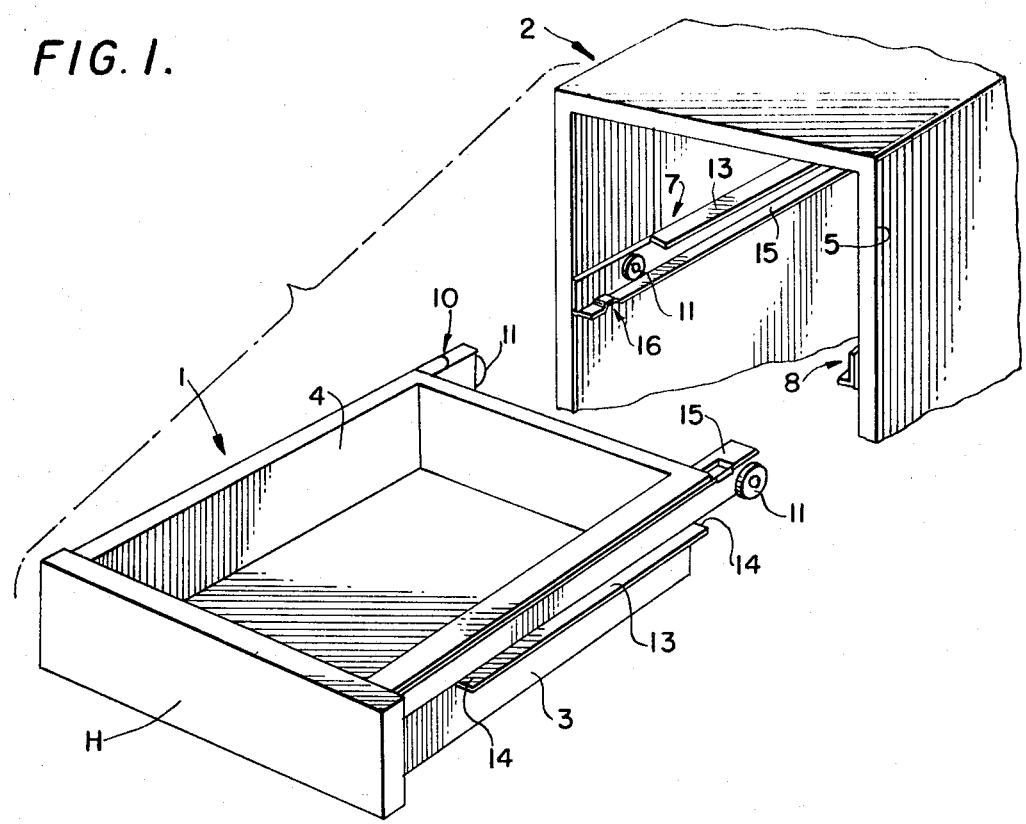
FIG. 1 is a partial perspective view and illustrates the drawer suspension system of the present invention with the case and drawer in an exploded relationship.

Referring now to the drawings, more particularly FIG. 1, the present invention will be understood to relate to movable support means as applied to a drawer or other form of extensible member 1 associated with a cabinet, case or other type of enclosure 2. The most common adaptation of the instance suspension system will be found in mounting drawers in either filing cabinets or office desks, although the guide elements or channels may be utilized to movably mount any type of extensible member within various types of enclosures.

Figure 2:
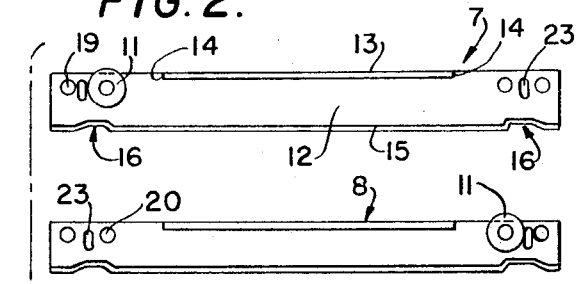
FIG. 2 is a side elevation of the single channel construction of the present invention and illustrates the various possible positions of the single roller as employed in each of the four channels utilized to support a single drawer.

The movable suspension is provided by the attachment to the opposite sides 3–4 of a drawer 1 of a pair of slide or guide channels which cooperate with a pair of similar slide channels mounted within the confines of the enclosure 2 adjacent its sides 5 and 6. An important feature resides in the specific construction of the channels and it will be seen from a review of FIG. 2 that a single channel configuration is employed on both sides of both the drawer and the case or enclosure. The uppermost channel illustrated in FIG. 2 represents the case channel 7 which is to be attached to the left hand side wall 6 of the case. The second channel 8 represents the channel to be attached to the right hand wall 5 of the case. The third channel 9 indicates the arrangement of the channel to be attached to the right side wall 3 of the drawer, while the remaining channel 10 reflects the channel adapted to be attached to the left hand side wall 4 of the drawer.

From a review of the four channels 7–10 shown in FIG. 2, it will be seen that all of the channels are of identical construction and it is the mounting of the single supporting roller 11 thereupon that determines the ultimate positioning and use of any one channel. Each channel comprises a longitudinal member, preferably formed by stamping, punching, and bending of a metallic material, and which includes a vertically disposed side wall 12. Projecting outwardly from one longitudinal edge of the side wall 12 is a short lateral flange 13 which is medially disposed with respect to the axial length of the channel and which terminates to provide end portions 14 well spaced from the distal portions of the channel. It will be observed that each of the two end portions 14 is spaced from the respective end of the channel an equal distance. Projecting outwardly from the opposite longitudinal edge of the channel is a long lateral flange 15 which extends the entire length of the channel and which may define a lateral extent equal to that of the short lateral flange 13. Spaced inwardly a short distance from each end of the channel is a protrusion 16 formed in the material of the long lateral flange 15.

The specific construction of each protrusion 16 will be most clearly appreciated from a review of either FIG. 3 or FIG. 4. The protrusions comprise a deformation of the long lateral flange 15 in a direction towards the opposite longitudinal edge of the channel to provide a shoulder or stop 17 at its inner end and a ramp or inclination 18 at the opposite end which is juxtaposed from the distal portion of the channel. The vertical extent of the protrusion is selected to insure that the shoulder portion thereof will provide a positive stop for an approaching roller 11, and, as will be seen in FIG. 4 for example, the two protrusions on each channel are equally spaced from the respective adjacent channel ends with each of the ramp portions 18 inclined towards the ends of the channel. From the foregoing description, it will be apparent that each channel 7–10 is of a symmetrical configuration about either side of an imaginary vertical center line.

In order to provide for the selective positioning of a single supporting roller 11 upon each channel, a plurality of roller attaching openings 19, 20, 21, and 22 are provided through the side wall 12 of each channel with a spaced-apart pair of said openings being included adjacent each end of each channel. For reasons which will be set forth hereinafter, one of each pair of openings 19–20 and 21–22 is positioned with its center axis vertically offset from its next adjacent opening. Additionally, a mounting slot 23 is provided intermediate each pair of said roller attaching openings. This slot may be formed as an elongated opening having a vertically disposed longitudinal axis and will be understood to serve as means for securing each of the channels to either the drawer sides or the case sides, respectively. This attachment may be made by use of conventional nuts and bolts, for example, and the elongated feature of the slots provides for precise adjustment of the channels during initial assembly thereof.

Figure 8:
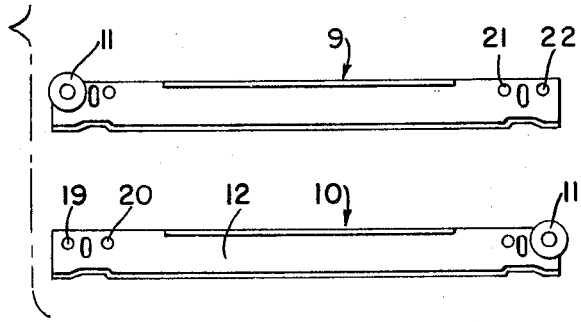
FIG. 8 is a fragmentary side elevation and illustrates the sequence of movement between a related drawer and case channel during removal of a drawer from the case or closure.

A typical mounting sequence of the channels will now be described. As shown in FIGS. 1, 3, and 4, a pair of channels 9 and 10 are attached to the right side wall 3 and left side wall 4, respectively, of the drawer 1. These channels 9 and 10 are mounted upon the drawer side walls with the long lateral flanges 15 thereof in the uppermost position and with the supporting roller 11 for each of these channels located in the rearmost roller attaching opening of both channels. The two case channels 7 and 8, on the other hand, are attached to the left side wall 6 and right side wall 5, respectively, with the short lateral flanges 13 thereof in the uppermost position and with a single supporting roller 11 attached to the second roller attaching opening from the forward ends thereof. With the rollers 11—11 mounted as shown in the two case channels 7 and 8, it will be observed that an access 24 is provided between each case roller 11 and the juxtaposed end portion 14 of the short lateral flange 13. This access 24 defines a horizontal dimension which is only slightly greater than the diameter of the supporting rollers 11 so that, during either the assembly of a drawer within a case or during subsequent separation of a drawer from a case, the drawer channel supporting roller may be passed through this access 24 in the manner illustrated in FIG. 8.

Figure 7:
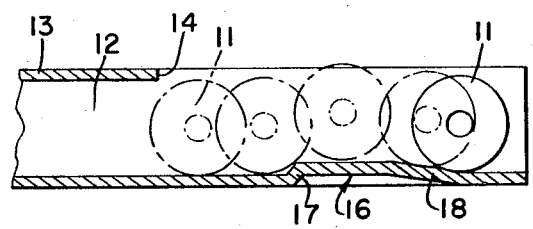
FIG. 7 is a fragmentary side elevation and illustrates in broken lines the sequence of movement of a drawer channel roller in relation to a case channel during closing movement of the drawer.

After passage of the drawer roller 11 through the access 24 it will be seen that the roller is of a diameter slightly less than the vertical distance between the two opposed surfaces of the short and long lateral flanges, which vertical distance may be considered a track serving to guide and support the roller during rectilinear movement of the drawer. As the drawer is pushed inwardly from the open position, as reflected in FIG. 4, to the fully closed position of FIG. 3, the drawer channel rollers 11—11 will be moved rearwardly through the track formed between these channels until the drawer rollers abut the shoulder or stops 17 adjacent the rear of the case channels. This abutment occurs short of the complete closing of the drawer within the case and will be reflected as a noticeable resistance to the operator. It then requires an additional rearward force upon the head H of the drawer to urge the drawer rollers over the shoulder 17 at which time the roller continues rearwardly as shown in the sequence positions of FIG. 7. At this point the self-closing feature of the present invention occurs since gravity causes the final rearward movement of the drawer channels when the drawer rollers 11—11 pass down the ramp portions 18 of the rear case channel protrusions 16. From the fully closed position shown in FIG. 3 it will be seen that the drawer rollers 11 are disposed at the bottom of the ramp portions 18 and are yet short of the very end of the case channels. This final closed position between the related drawer and case channels is assured by means of the stop 17 on the forwardmost protrusion 16 of the drawer channels 9 and 10.

If the drawer is shoved or slammed violently inward from the open position, as reflected in FIG. 4, to the fully closed position of FIG. 3, the drawer channel rollers 11—11 will as previously noted travel rearward until the rollers abut the shoulder 17 adjacent the rear of the case channels. This abutment occurs short of the complete closing of the drawer within the case and will be reflected as a slowing down or braking of excessive speed. The braking action is caused by the drawer rollers 11—11 being forced to lift the weight of the drawer and contents up and over the rise of the case channel shoulder 17. As the drawer rollers move over the top of the protrusion 16 and onto the self-closing ramp 18 the weight of the drawer and contents will move the drawer rollers 11—11 to the end of their travel along the ramp 18. At this point the anti-rebound feature of the present invention occurs. The drawer will not tend to rebound or bounce back open when slammed shut since the drawer rollers 11—11 would have to roll back up the incline 18 against the weight of the drawer and contents.

The sequence of movements is reversed during opening of a drawer from its case or enclosure. Initially a small, yet greater, than normal force is required during withdrawal of the drawer in order to pull the drawer channel rollers 11 up the ramp portions of the rearmost case protrusions 16, after which a normal force is applied to fully withdraw the drawer from its case. The outermost limit of normal drawer extension will be defined by the abutment of the shoulder 17 of the rearmost drawer channel protrusion 16 against the case channel rollers 11. This abutment of the drawer protrusion shoulder 17 and the case roller 11 serves as the drawer out stop.

Also to be noted is the relative displacement between the two roller mounting holes 19-20 at one end of each channel as well as between the holes 21-22 at the opposite end of each channel. Each pair of these openings is located with the innermost hole disposed at a slightly higher elevation which will be most clearly evident in FIG. 4 wherein the axis of the inner hole 20 is located above the horizontal plane of the axis of the outer hole 19 to provide the offset 25 identified in the left hand portion of this figure. With the understanding that this same offset relationship is present at both ends of all channels 7-10, it will follow that the two rollers 11 attached to the pair of channels at each side of the drawer 1 will be rotating on axes disposed in vertically offset planes since the drawer channel roller will be mounted in the outermost opening while the case channel roller will be carried by the innermost opening. This arrangement produces the illustrated angle of rise 26 whereupon the suspension will rise up as it is withdrawn in order to compensate for the inherent sag caused by the weight of the extended suspension and the drawer.

An arrangement is illustrated in FIG. 9 disclosing the adaptation of the channel element of the present invention for use with a suspension of the "pass through" or two-way type of file cabinet or enclosure. In this respect, each of the drawer and case channels is provided with a pair of rollers 11. The case channel 27 supports rollers in the two innermost openings 20 and 21 while the inverted juxtaposed drawer channel 28 will be seen to carry a roller 11 in each of the outermost openings 19 and 23. The uppermost portion of FIG. 9 illustrates the drawer channel 28 as it is being withdrawn from a first side of an enclosure while the intermediate pair of channels are shown as they would appear when the drawer channel is fully contained within the case channel 27, in which position both of the case channel rollers 11—11 will be seen to abut the two stop shoulders 17—17 of the drawer channel 28. The lowermost portion of this figure illustrates the relative position of the two channels as the drawer channel 28 is partially withdrawn from the second side of the enclosure. From the above, it will be seen that the same case and drawer channels may be utilized to provide the suspension of the present invention in either a one-way or two-way acting system. The only alteration to achieve this adaptation is the inclusion of the extra roller for each of the channels involved, which rollers may be of a narrower width than in the first described embodiment in order to permit passing of the outermost drawer channel roller with respect to the stationary rollers of the case channel as the drawer is shifted from one side of the enclosure to the other.

From the foregoing explanation it will be seen that although an identical channel element is utilized to provide the suspension elements of both a drawer and its case, nevertheless, by the inversion and reversing of this single element a unique cooperating arrangement is produced which serves to offer both a self-closing type of drawer suspension as well as stop means during both closing and opening the drawer.

I claim:

1. A suspension assembly for movably mounting a drawer within a case comprising, a slide channel attached to the outside of the drawer, a slide channel attached to the inside of the case in juxtaposed relationship to said drawer-mounted channel, said channels of substantially identical construction and each including a vertical sidewall, a long lateral flange projecting from one longitudinal edge and extending substantially the length of the channel, a short lateral flange projecting from the opposite longitudinal edge and having end portions terminating well short of the channel ends, protrusions formed adjacent both ends of each said long lateral flange and extending toward the opposite longitudinal edge of each channel, each said protrusion bounded by a stop shoulder on its end adjacent the medial portion of the channel and a ramp on its end adjacent the end of the channel, said two identical channels attached to the respective drawer and case in inverted relationship to each other, a support roller mounted upon the sidewall of said drawer-attached channel adjacent its one end portion and adapted to travel between said two lateral flanges of said case-attached channel, and a support roller mounted upon the sidewall of said case-attached channel adjacent its end portion opposite that of the drawer-attached channel and adapted to travel between said two lateral flanges of said drawer-attached channel.

2. A suspension assembly according to claim 1 wherein, said channel sidewalls are provided with a pair of longitudinally adjacent openings adjacent each end thereof to permit the selective attachment of said support roller on each said channel.

3. A suspension assembly according to claim 1 wherein, said channel sidewalls are provided with a pair of longitudinally adjacent openings adjacent each end thereof to permit the selective attachment of said support roller on each said channel, and said roller on said drawer-attached channel is connected to the rearmost of said openings while said roller on said case-attached channel is connected to the second forwardmost of said openings.

4. A suspension assembly according to claim 1 wherein, said channel sidewalls are provided with a pair of longitudinally adjacent openings adjacent each end thereof to permit the selective attachment of said support roller on each said channel, and said short flange end portions each terminate short of a respective pair of said openings to provide a roller access between each said short flange end portion and the next adjacent one of said openings.

5. A suspension assembly according to claim 1 wherein, said long flange of said case-attached channel is disposed at the bottom of its sidewall and said long flange of said drawer-attached channel is disposed at the top of its sidewall overlying said case channel roller.

6. A suspension assembly according to claim 1 wherein, the case is open at opposite sides and the drawer is adapted to be alternately withdrawn from either of said two sides and said case channel and drawer channel each having one of said support rollers mounted thereto adjacent both their end portions.

7. A suspension assembly according to claim 1 wherein, said drawer channel roller and case channel roller are mounted with their central axes vertically offset whereby said drawer channel is withdrawn at an upwardly inclined angle with respect to the longitudinal axis of said case channel.

8. A suspension assembly according to claim 5 wherein, said case and drawer channel rollers are relatively longitudinally spaced from one another so that said case channel roller abuts one said drawer channel stop shoulder after said drawer channel roller passes over one said case channel protrusion and down its ramp when said drawer is in its innermost position.

9. A suspension assembly according to claim 5 wherein, said case and drawer channel rollers are relatively longitudinally spaced from one another so that said case channel roller abuts one said drawer channel stop shoulder while said drawer channel roller is retained within said case channel when said drawer is in its withdrawn position.

References Cited

UNITED STATES PATENTS 3,053,582 9/1962 Wenger _____ 308—3.8

FOREIGN PATENTS 1,236,644 6/1960 France _____ 312—339

MARTIN P. SCHWADRON, Primary Examiner

R. H. LAZARUS, Assistant Examiner

U.S. Cl. X.R.

312—339, 348

UNITED STATES PATENT OFFICE
CERTIFICATE OF CORRECTION

Patent No. 3,664,716            Dated May 23, 1972

Inventor(s) RONALD C. JOHNSON

Figure 6:
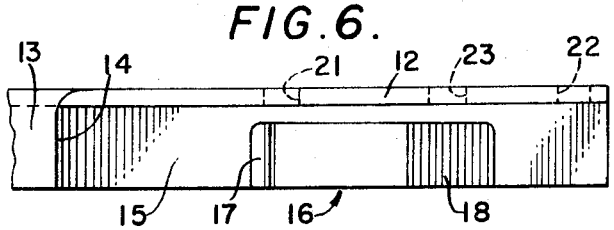
FIG. 6 is a fragmentary top plan view taken along the line 6—6 of FIG. 4.

It is certified that error appears in the above-identified patent and that said Letters Patent are hereby corrected as shown below:

Sheet 2 of the drawings, "FIG. 6" should be

--FIG. 5--.

Signed and sealed this 21st day of November 1972.

(SEAL)
Attest:

EDWARD M. FLETCHER, JR.            ROBERT GOTTSCHALK
Attesting Officer                      Commissioner of Patents